Figures 1, 4:
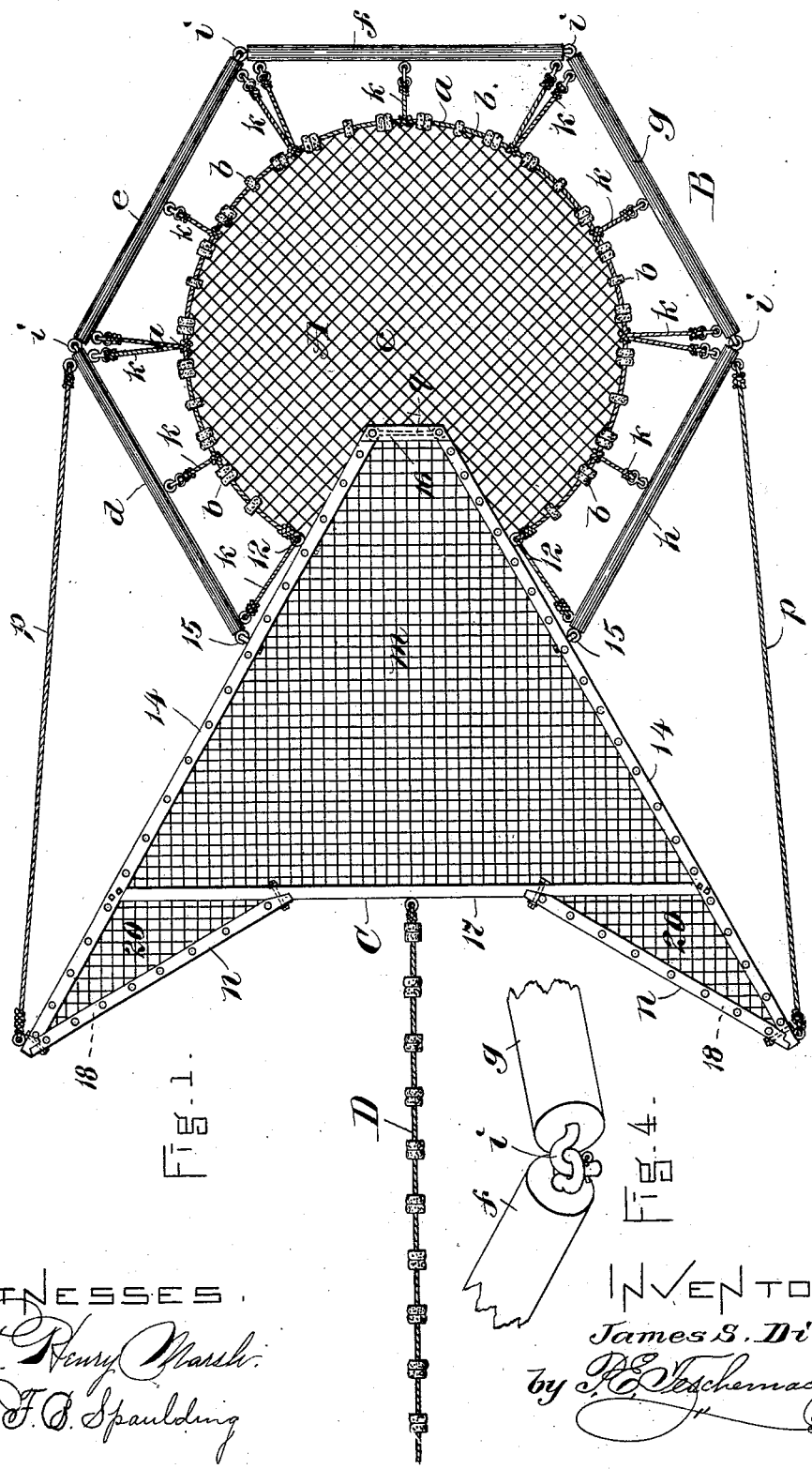

No. 699,084. Patented Apr. 29, 1902.
J. S. DILL.
FLOATING SEINE NET OR WEIR FOR FISHING.
(Application filed Aug. 23, 1901.)
(No Model.) 3 Sheets—Sheet 1.

WITNESSES. INVENTOR.
James S. Dill,

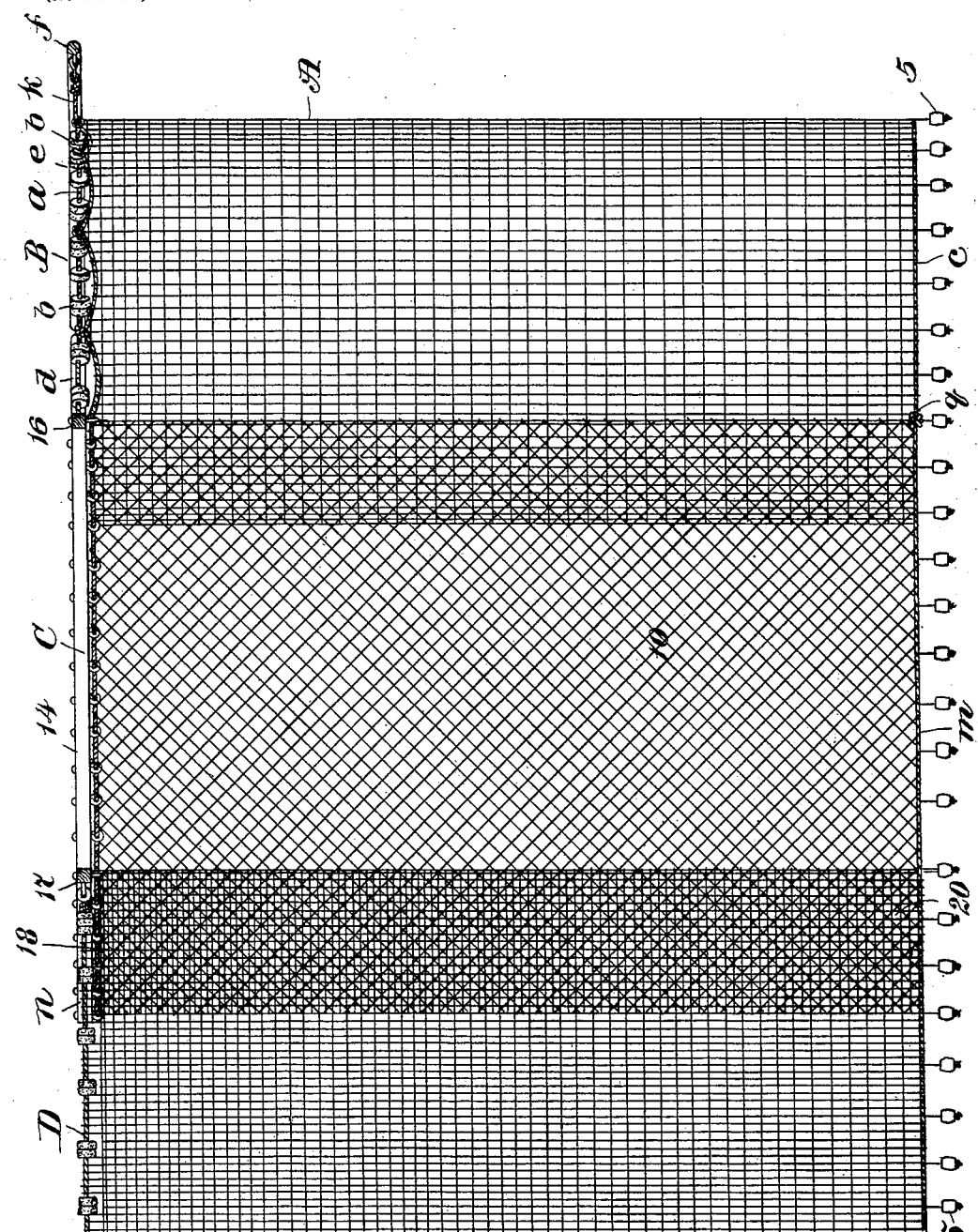

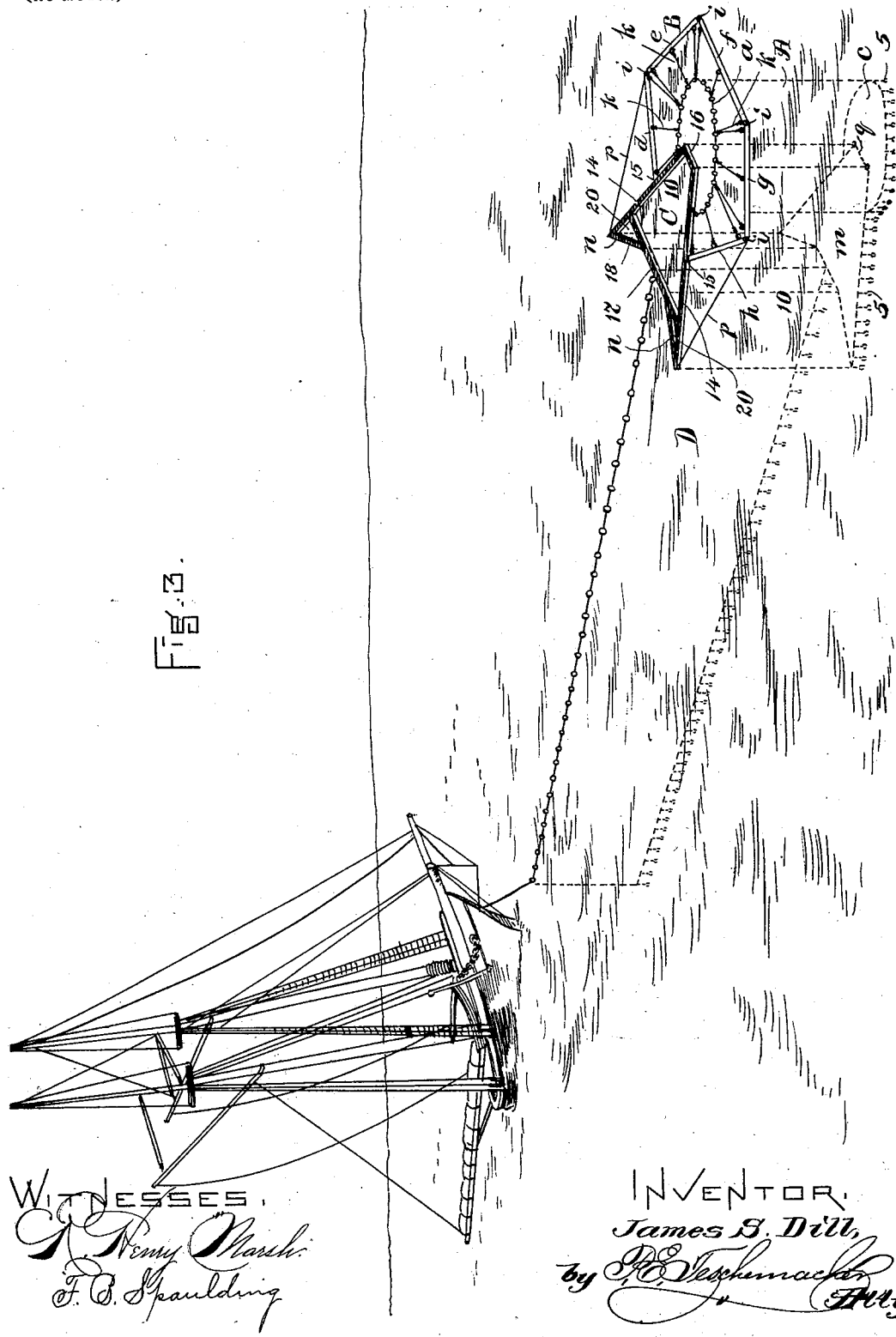

UNITED STATES PATENT OFFICE.

JAMES S. DILL, OF PROVINCETOWN, MASSACHUSETTS, ASSIGNOR OF ONE-HALF TO ROBERT A. HAMMOND, OF SANDWICH, MASSACHUSETTS.

FLOATING SEINE-NET OR WEIR FOR FISHING.

SPECIFICATION forming part of Letters Patent No. 699,084, dated April 29, 1902.

Application filed August 23, 1901. Serial No. 73,070. (No model.)

*To all whom it may concern:*

Be it known that I, JAMES S. DILL, a citizen of the United States, residing at Provincetown, in the county of Barnstable and State of Massachusetts, have invented certain Improvements in Floating Seine-Nets or Weirs for Deep-Sea or other Fishing, of which the following is a specification.

My invention has for its object to provide a simple and effective floating seine-net of the weir type for deep-sea and other fishing which will not require to be anchored and is adapted when set to drift with the vessel to which it may be attached and which when so drifting will be held at all times in proper operative position to entrap the fish.

To this end my invention consists in a seine-net of novel construction provided with a bottom and having its upper portion inclosed within and supported by a floating frame composed of spars or timbers connected together, said net having an inlet or passage-way provided with a bottom and vertical walls, the latter supported and held in place by said floating frame, as hereinafter fully described.

In the accompanying drawings, Figure 1 is a plan view of my improved floating seine-net. Fig. 2 is a central vertical section of the same. Fig. 3 is a perspective view of the same when set and ready for use. Fig. 4 is a detail to be referred to.

In the said drawings, A represents a seine-net provided around its upper edge $a$ with the usual floats $b$ and having a bottom $c$, preferably provided around its edge with weights 5 to keep the walls or sides of the net hanging vertically in the water, as required. The upper edge of this net, which when hanging in the water is preferably of cylindrical form, is inclosed within a floating frame B, composed of spars or timbers $d\ e\ f\ g\ h$, having their abutting ends loosely connected together by suitable detachable couplings $i$, Figs. 1 and 4, the upper edge of the net being attached to the frame B by cords $k$ or other suitable fastenings, whereby it is supported and held in proper operative position, forming the "pound" or receptacle for containing the fish.

C is a converging entrance or passage-way leading into the pound and forming what is known as the "heart." The two vertical side walls 10 10, Fig. 2, of the passage-way, which are formed of netting, are of the same depth as the net A, being secured to the latter at 12 12 and having their inner edges extended nearly to the center of the net A, as shown in Fig. 1. This passage-way is provided with a bottom $m$, secured at its edges to the side walls 10 10, the upper edges of which are secured to and supported by timbers or spars 14 14, coupled at 15 15 to the spars $d\ h$ of the frame B and forming a part of the same, said spars 14 14 being connected at their inner ends by a short piece 16 and near their outer ends by a spar 17. The outer ends 18 18 of the netting forming the walls 10 10 are turned inward at an angle, as shown in Fig. 1, their upper edges being secured to and supported by short spars $n\ n$, connected at their outer ends to the outer ends of the spars 14 14 and at their inner ends to the transverse spar 17, said inturned ends forming pockets 20 in the heart to prevent the escape of the fish. The lower edges of the netting forming the entrance or passage-way C are intended to be properly weighted to keep the walls in a vertical position, the inner ends of these walls at the bottom being connected by a rod $q$, which holds them apart to form a clear opening for the entrance of the fish to the pound.

$p\ p$ are guy-ropes extending from the outer ends of the spars 14 14 to the junctions of the spars $d\ h$ with the spars $e\ g$, said ropes serving to maintain the floating frame in its proper position when in use.

Secured to the center of the transverse spar 17 is the "lead" D, consisting of a long piece of netting connected at its inner end with the spar 17 and extending down to and connected with the outer edge of the bottom $m$ of the passage-way or heart, the outer end of the lead D being attached to the fishing vessel lying to leeward, as shown in Fig. 3, said vessel when drifting and towing the entire apparatus serving to keep the lead stretched, which then forms a vertical wall for guiding the fish which may swim against it on either side directly into the passage-way or heart C, on entering which the fish soon find their way into the pound A, and as the pound and the passage-way thereto are both provided with a bottom, as previously described, it will be impossible for the fish to escape by diving.

The above-described floating weir or fish-trap possesses many advantages which especially adapt it for deep-sea fishing, as it requires no anchoring, can be easily taken apart and put aboard a vessel, and when required for use can be put together and set in a very short time and easily handled from a boat when the fish are to be removed from the pound.

What I claim as my invention, and desire to secure by Letters Patent, is—

1. A floating fish-net comprising a "pound" closed at its bottom and sides and provided at its upper edge with floats or corks, a V-shaped "heart" entering the point of the pound and having a bottom connecting the lower edges of its side walls, a V-shaped buoyant frame to which the upper edges of the heart are connected, a buoyant, sectional, hinged framework of spars or the like exterior to said pound and flexibly secured to and spaced beyond the upper edge thereof, the front ends of the two forward spars or frame-sections being flexibly secured or hinged to the sides of the said V-shaped frame, and the forward ends of the sides of the heart and its frame having inwardly-inclined sections to prevent the return of the fish, substantially as set forth.

2. A floating fish-net comprising a "pound" closed at its bottom and sides and provided at its upper edge with floats or corks and weighted at its lower edge, a V-shaped "heart" closed at its bottom, provided at the upper edges of its sides with a V-shaped buoyant frame and weighted at its lower edges, the rear smaller end of the heart entering the pound and the forward ends of the heart having inwardly-inclined walls to prevent return of the fish, a buoyant pound-frame surrounding and spaced from the upper edge of the pound and comprising a series of spars separably connected at their adjacent ends by hooks and eyes, the front end of the forward spars being similarly connected to the sides of the V-shaped frame, cords or ropes securing the upper edge of the pound to said spars as shown at $k$, guy-ropes connecting the forward end of the V-shaped frame with the sides of the pound-frame, and a floating "lead" connected at its rear end to the middle of the heart to direct the fish to either side thereof and provided with floats at its upper end and weighted at its lower end, substantially as set forth.

Witness my hand this 20th day of August, A. D. 1901.

JAMES S. DILL.

In presence of—
P. E. TESCHEMACHER,
THOS. B. COTTER.